Aug. 15, 1944.  W. C. HANSEN  2,355,860

MOTOR VEHICLE

Filed Dec. 19, 1942

INVENTOR
WRAY C. HANSEN
BY
*Harness, Lind, Pater & Harris*
ATTORNEYS

Patented Aug. 15, 1944

2,355,860

UNITED STATES PATENT OFFICE 2,355,860

MOTOR VEHICLE

Wray C. Hansen, Detroit, Mich., assignor to Chrysler Corporation, Highland Park, Mich., a corporation of Delaware Application December 19, 1942, Serial No. 469,525

4 Claims. (Cl. 15—253)

This invention relates to a motor vehicle and more particularly to a windshield therefor and surface cleaning means for the latter.

The main object of the invention is the provision of an arrangement for conducting energy from a source of supply to a power operator for a windshield cleaner element and particularly where this source and the power operator are relatively remotely disposed, the windshield is mounted for swinging movement and the power operator and the power conducting means are secured to the windshield for movement therewith.

Another object of the invention is to provide an arrangement according to the foregoing wherein the windshield mounting means includes a normally stationary pivot forming member for the windshield having an opening therein receiving and supporting the energy conducting means for movement relative thereto with the windshield.

Other objects and advantages of the invention will be more apparent from the following description taken in connection with the accompanying drawing, in which.

Figure 1:
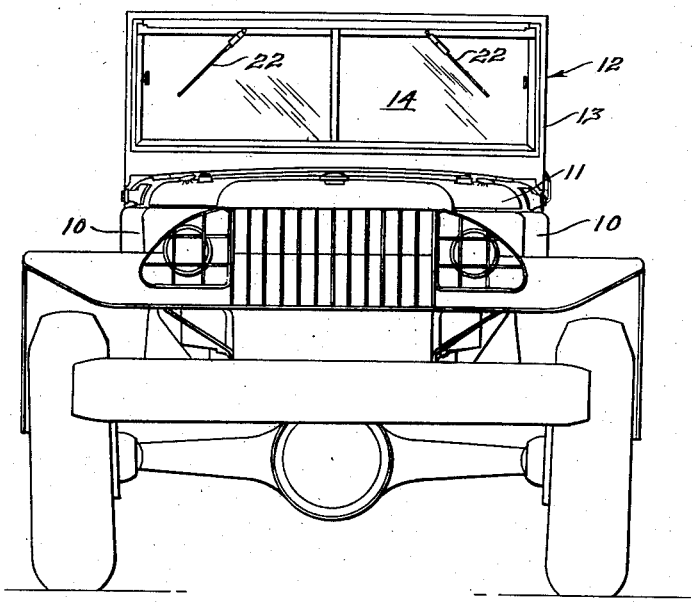
Fig. 1 is a front elevational view of a motor vehicle embodying the invention.

Referring to the drawing, the invention is illustrated in conjunction with a motor vehicle having a cowl 10 and powered by an internal combustion engine (not shown) housed in the conventional compartment therefor forwardly of the cowl 10 and covered by the hood 11. A windshield structure 12 extends upwardly from the cowl 10 and includes a frame 13 and a glass 14 secured to the latter for swinging movement relative thereto to the dotted line position shown in Fig. 2. An arm 15 is secured to each lateral side of the frame 13 and extends generally forwardly to register with an adjacent bracket 16 fixed to the cowl 10, the bracket having a threaded opening 17 registering with an opening 18 in the cowl.

Each arm 15 is secured to its adjacent bracket 16 by a hollow pivot pin 19 removably threaded into bracket opening 17, the arm having an opening receiving the pin and being retained between the free end face of the bracket and the head of the pin. The pin 19 has a shoulder 20 engageable with the bracket to limit axial movement of the pin into the opening 17 and thus prevent bringing of the arm 15 between the bracket and head of the pin. Each pin is normally rotatably stationary during movement of the windshield structure between its upright position and the dotted line horizontal position shown in Fig. 2. The hood 11 carries a latch 21 detachably engageable with the structure 12 when the latter is in its horizontal position.

Figures 2, 3:
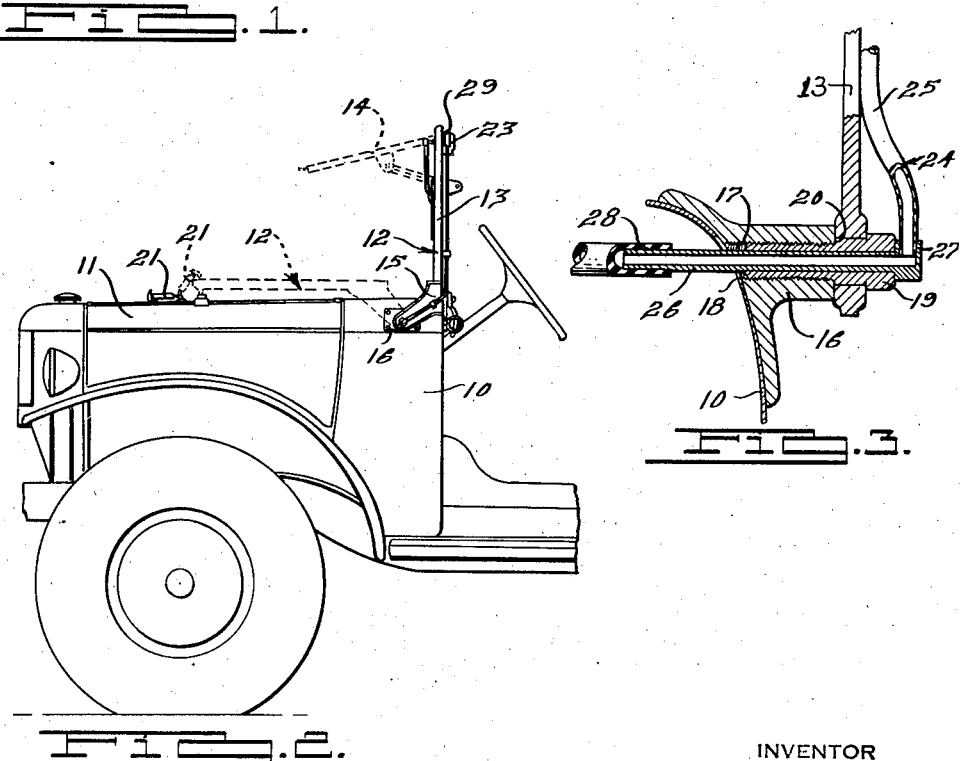
Fig. 2 is a fragmentary side elevational view of the vehicle shown in Fig. 1.
Fig. 3 is an enlarged sectional view illustrating more particularly the pivotal support at one lateral side of the windshield shown in Figs. 1 and 2.

The windshield structure is provided with laterally spaced reciprocable cleaner elements 22, each of which is reciprocated by a vacuum operated motor, one of which is shown at 23 in Fig. 2, of the conventional well known type secured to and movable with the structure 12. Each motor 23 communicates with vacuum producing means of the internal combustion engine powering the vehicle in the well known manner by means of a conduit, generally identified by the numeral 24, including a relatively rigid section 25 detachably secured to the adjacent arm 15 and the windshield frame 13, a similar section 26 extending through the pivot pin 19 and detachably connected at 27 with the section 25. A section of flexible conduit 28 connects the section 26 with the engine intake manifold (not shown) while a similar section 29 (Fig. 2) connects the section 25 with the motor 23. Suitable means (not shown) retains the structure 12 in its vertical position and is releasable therefrom to accommodate swinging movement thereof to a horizontal position, the conduit section 26 turning relative to the pin 19 during this swinging movement. The section 28 turns with the section 26 and may have such a length as to prevent undesired constriction when so turned.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a motor vehicle including an internal combustion engine having vacuum producing means, a cowl having an opening therein, a windshield structure extending generally upwardly from said cowl, means securing said windshield to said cowl for swinging movement relative thereto, said means including a relatively rigid bracket carried by said cowl having an opening registering with said cowl opening and a hollow pin extending into said bracket opening securing the windshield structure to said bracket for swinging movement relative thereto, a reciprocable cleaner element for a surface of said windshield structure, a vacuum operated motor carried by and movable with said windshield structure for reciprocating said element, and conduit means extending through said cowl opening and said pin communicating with said vacuum producing means and said motor and secured to said windshield structure for rotative movement therewith relative to said bracket.

2. In a motor vehicle including an internal combustion engine having vacuum producing means, a cowl, a windshield structure extending generally upwardly from said cowl, means supporting said windshield from said cowl for pivotal movement about a horizontal axis, a reciprocable cleaner element for a surface of said windshield structure, a vacuum operated motor carried by and movable with said windshield structure for reciprocating said cleaner element, and conduit means communicating with said vacuum producing means and said motor, said conduit means including a relatively rigid portion extending through said support means in parallel relationship with said horizontal axis and being supported thereby for rotative movement about said horizontal axis when said windshield structure is moved as aforesaid.

3. In a motor vehicle including an internal combustion engine having vacuum producing means, a windshield structure, means including a normally rotatably stationary pin having an axial bore supporting said windshield for pivotal movement about a horizontal axis, a reciprocable cleaner element for a surface of said windshield structure, a vacuum operated motor carried by and movable with said windshield structure for reciprocating said cleaner element, and conduit means communicating with said vacuum producing means and said motor and secured to said windshield structure for movement therewith, said conduit means including a relatively rigid section extending through said bore for rotative movement relative thereto about a horizontal axis when said windshield structure is moved as aforesaid.

4. In a motor vehicle including an internal combustion engine having vacuum producing means, a cowl, a windshield structure extending generally upwardly from said cowl, spaced brackets fixedly secured to said cowl each having a threaded opening, normally rotatably stationary pivot forming pins respectively threaded into said openings securing said windshield structure to said brackets for movement about a horizontal axis, at least one of said pins having an opening axially therethrough, a reciprocable cleaner element for a surface of said windshield structure, a vacuum operated motor carried by and movable with said windshield structure, and conduit means communicating with said vacuum producing means and said motor extending through said pin and secured to said windshield structure for rotative movement therewith relative to said pin.

WRAY C. HANSEN.